W. A. BIRD.
SEED PLANTER.
APPLICATION FILED OCT. 30, 1913.
1,093,376.
Patented Apr. 14, 1914.
2 SHEETS—SHEET 1.
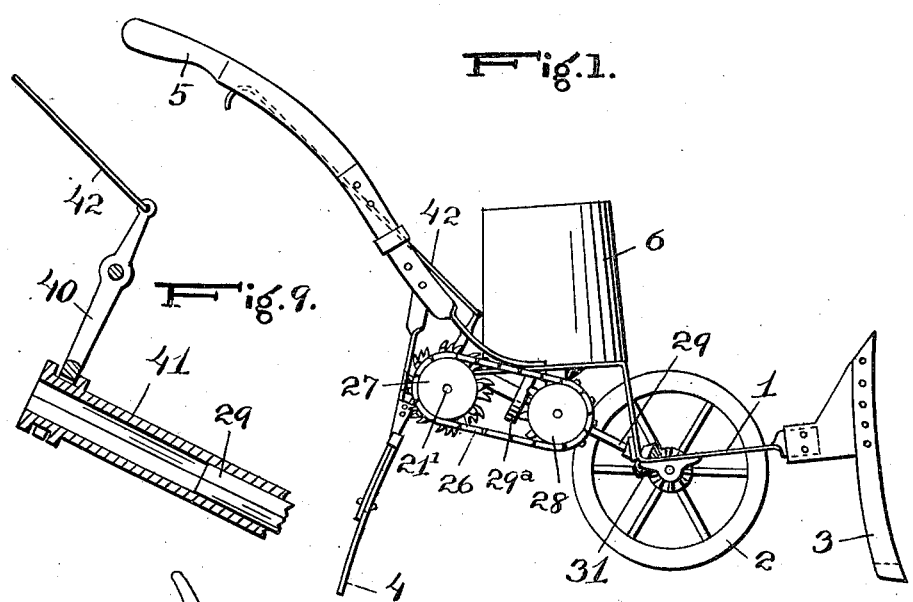
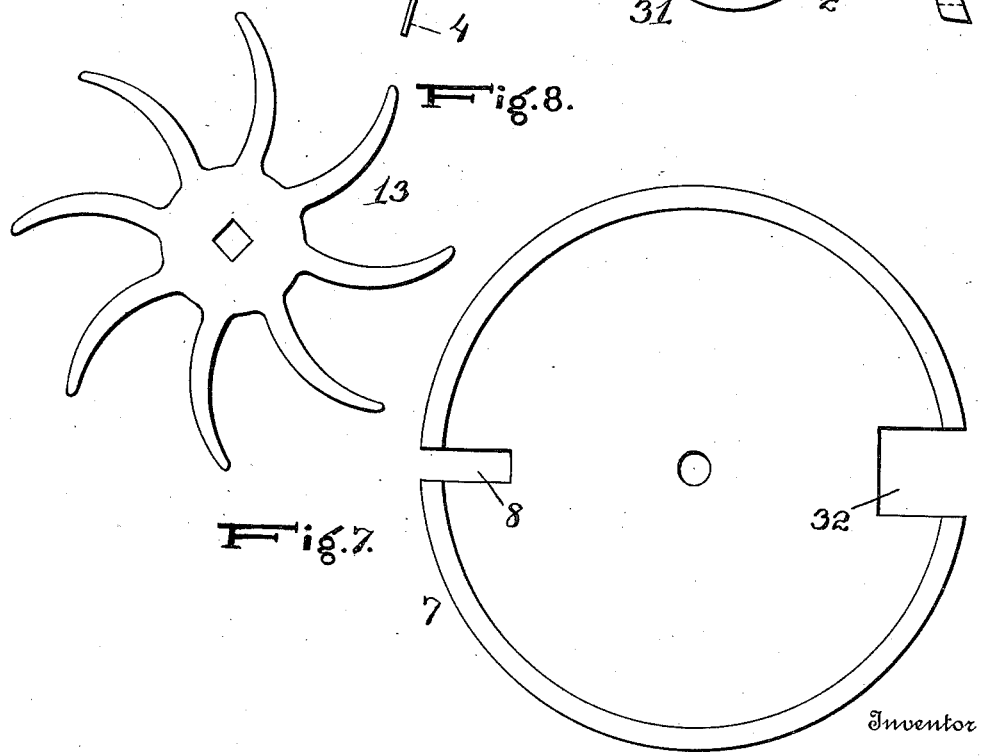
Witnesses
Stuart Hilder.
Frances W. Anderson
Inventor
Willis A. Bird.
By
E. W. Anderson Son
his Attorneys

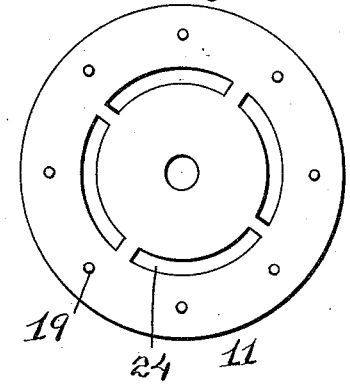
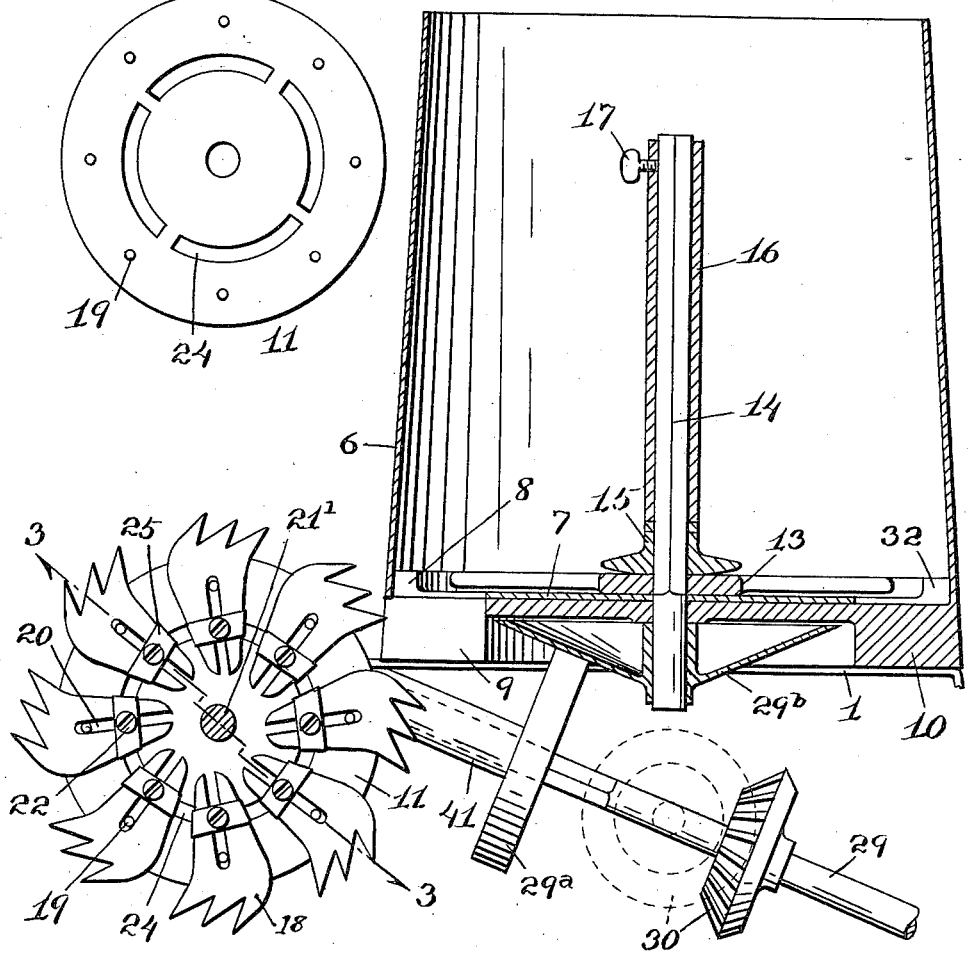
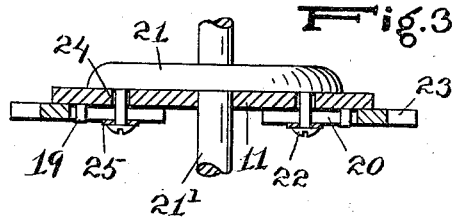
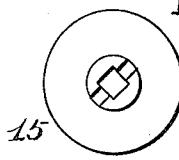

UNITED STATES PATENT OFFICE.

WILLIS A. BIRD, OF HEADLAND, ALABAMA.

SEED-PLANTER.

1,093,376.   Specification of Letters Patent.   Patented Apr. 14, 1914.

Application filed October 30, 1913. Serial No. 798,366.

*To all whom it may concern:*

Be it known that I, WILLIS A. BIRD, a citizen of the United States, resident of Headland, in the county of Henry and State of Alabama, have made a certain new and useful Invention in Seed-Planters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the seed planter, showing the invention as applied. Fig. 2 is a central vertical section of the hopper, showing the finger disk and drive mechanism in side view and partly broken away. Fig. 3 is a section on the line 3—3, Fig. 2. Fig. 4 is a detail side view of the rotary disk which carries the fingers. Fig. 5 is a detail plan view of the lower flanged sleeve. Fig. 6 is a detail plan view of the upper sleeve. Fig. 7 is a detail plan view of the hopper bottom plate. Fig. 8 is a detail plan view of the stirrer wheel. Fig. 9 is a detail section view of the adjusting means for the friction drive of the stirrer wheel.

The invention has relation to seed planters, designed mainly for use in planting cotton and corn, and it consists in the novel construction and combinations of parts as hereinafter set forth.

In the accompanying drawings illustrating the invention, the numeral 1 designates the frame of the machine, 2, the carrying wheel thereof, 3, the furrow opener for the seed, 4, the coverer for the seed, 5, the handles, and 6, the hopper. The hopper is provided with a stationary bottom plate 7, having in rear a marginal opening 8 leading downward to the slot or opening 9 of the hopper bottom 10. A rotary disk 11 is carried by the frame in rear of the hopper and is provided with fingers 18 engaging the slot in the hopper bottom in the rotation of the disk to comb the seed from the slot. Above the stationary bottom plate 7 of the hopper is a stirrer wheel 13, having fast connection with an upright rotary shaft 14, having a journal bearing in the hopper bottom. The stirrer wheel is held down to the bottom plate 7 by suitable means, such as a lower flanged sleeve 15 and an upper sleeve 16, both having squared apertures engaging the squared portion of the upright shaft, a set screw 17, engaging the upper sleeve and said shaft to fix the parts in position.

The finger disk is provided with a circumferential series of radially projecting fingers 18, each pivoted upon a lateral pin 19 of the disk, said pin engaging a longitudinal slot 20 of the finger. A rotary plate 21 at one side of the disk is provided with adjustment screws 22, having threaded engagement with said plate, and passing through the longitudinal slots of the fingers, whereby upon turning said disk, (the plate 21 being stationary upon the shaft 21' thereof) said fingers will move with the disk and the screws will cause adjustment of the fingers pivotally forward or backward upon the pins 19, to project to a greater or less degree from the edge of the disk. When the screws are tightened the fingers will be held in position as adjusted, and the finger disk and the plate 21 will be secured to move together upon turning of the shaft 21'. The fingers have oblique serrated operating ends 23, which, in the pivotal adjustment of the fingers, assume a greater or less degree of inclination, with varying effect in combing the seed from the slot of the hopper bottom. The adjustment screws pass through and work in arcuate slots 24 of the finger disk, and are provided with transverse plates 25, beneath the heads thereof, said transverse plates having angularly turned ends engaging the lateral edges of the fingers.

Suitable drive mechanism for the stirrer plate of the hopper and the finger disk is provided, being usually a sprocket chain 26, at one side of the hopper, engaging a sprocket wheel 27 upon the shaft 21' of the finger disk or of the plate 21; and a sprocket wheel 28, located at one side of the hopper and having a bevel gear connection 30 with an inclined shaft 29. The shaft 29 has at its lower end a gear connection 31 with the carrying wheel of the machine, and at its opposite end an adjustable friction disk 29$^a$, having driving engagement with a friction cone 29$^b$ upon the hopper shaft. The hopper bottom plate 7 has a wider opening 32, used in planting corn. Suitable means are provided to adjust the friction disk 29$^a$ with relation to the cone 29$^b$, being usually a lever 40, having engagement with the hollow shaft 41 of the friction disk, an adjusting rod 42 being provided for said lever.

What I claim is:—

1. In a seed planter, a hopper having a bottom provided in rear with a discharge opening, a bottom plate having a discharge opening in line with said opening of the hopper bottom, a rotary member above said bottom plate, a finger disk in rear of the hopper, a series of radial fingers having pivotal connection with said disk and provided with inclined serrated outer ends engaging the discharge opening of the hopper bottom, means for adjusting said fingers upon their pivots to vary their degree of projection from said disk and the inclination of the serrated ends, and means for rotating said rotary member and said disk.

2. In a seed planter, a hopper having a bottom provided in rear with a discharge opening, a bottom plate having a discharge opening in line with said opening of the hopper bottom, a rotary member above said bottom plate, a finger disk in rear of the hopper, a series of fingers having pivotal connection with said disk and provided with inclined serrated outer ends engaging the discharge opening of the hopper bottom, a side plate for said disk having screws engaging slots of said disk and slots of the said fingers, said disk having rotation with respect to said side plate to adjust the fingers upon their pivots, and means for rotating said rotary member and said side plate and disk.

In testimony whereof I affix my signature, in presence of two witnesses.

W. A. BIRD.

Witnesses:
D. A. WALDEN, Jr.
W. W. CAMP.

---

Copies of this patent may be obtained for five cents each, by addressing the "Commissioner of Patents, Washington, D. C."